United States Patent [19]

Mislin et al.

[11] 4,101,547

[45] Jul. 18, 1978

[54] 1,4-DIAMINOANTHRAQUINONES

[75] Inventors: Roland Mislin, Saint-Louis, France; Wolfgang Schoenauer, Riehen; Karl Ulrich Steiner, Binningen, both of Switzerland

[73] Assignee: Sandoz Ltd., Basel, Switzerland

[21] Appl. No.: 700,064

[22] Filed: Jun. 25, 1976

[30] Foreign Application Priority Data

Jul. 2, 1975 [CH] Switzerland ............... 8596/75

[51] Int. Cl.² .............. C09B 62/20; C09B 62/28; C09B 1/22

[52] U.S. Cl. .................... 544/294; 8/1 D; 8/39 R; 106/22; 260/371; 260/372; 544/356

[58] Field of Search ............. 260/256.5 R, 256.4 R

[56] References Cited

U.S. PATENT DOCUMENTS

| | | | |
|---|---|---|---|
| 3,157,630 | 11/1964 | Stephen et al. | 260/146 |
| 3,162,628 | 12/1964 | Berrie et al. | 260/146 |
| 3,261,826 | 7/1966 | Andrew et al. | 260/153 |
| 3,351,578 | 11/1967 | Andrew et al. | 260/153 |
| 3,413,077 | 11/1968 | Bertin | 8/54 |
| 3,416,875 | 12/1968 | Ponzini et al. | 8/54.2 |
| 3,462,410 | 8/1969 | Schneider | 260/153 |
| 3,501,452 | 3/1970 | Bertin | 260/146 |
| 3,522,232 | 7/1970 | Saronno et al. | 260/146 |
| 3,709,869 | 1/1973 | Mazza | 260/153 |
| 3,853,840 | 12/1974 | Schündehütte | 260/146 D |

FOREIGN PATENT DOCUMENTS 457,669  8/1968  Switzerland ............. 544/294

*Primary Examiner*—Donald G. Daus
*Assistant Examiner*—Lisa Jones
*Attorney, Agent, or Firm*—Gerald D. Sharkin; Richard E. Vila; Thomas C. Doyle

[57] ABSTRACT

1,4-Diaminoanthraquinone derivatives containing a halopyrimidinyl or haloquinoxaline-6-carbonyl reactive group are useful as reactive dyestuffs for the dyeing or printing of leather and textile materials.

11 Claims, No Drawings

1,4-DIAMINOANTHRAQUINONES

The present invention relates to 1,4-diaminoanthraquinone derivatives.

More especially, the present invention provides compounds of formula I,

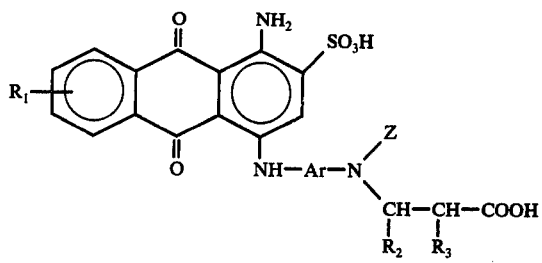

and water-soluble salts thereof,
in which
$R_1$ is a hydrogen atom or a sulpho group attached at the 5-, 6-, 7- or 8-position of the anthraquinone nucleus, each of
$R_2$ and $R_3$ is a hydrogen atom or one is a hydrogen atom and the other is a methyl group, Z is a 2,5,6-trihalopyrimidinyl-4, a 2-methylsulphonyl-5-halo-6-methylpyrimidinyl-4, or a 2,3-dihaloquinoxaline-6-carbonyl group, and Ar is a 1,3- or 1,4-phenylene or a 1,5-naphthylene group, unsubstituted or substituted with one or two substituents selected from $(C_{1-4})$ alkyl, $(C_{1-4})$ alkoxy, sulpho and carboxyl groups and halogen atoms, with the provisos (i) that the group

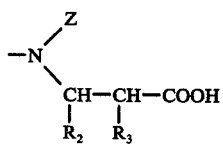

is not attached at an adjacent position on the phenylene or naphthylene nucleus to any sulpho substituent on that nucleus, and (ii) two sulpho and two carboxyl groups, or one sulpho and one carboxyl group cannot simultaneously be present on the phenylene nucleus.

In the above definition, the expression "halogen" or "halo" means fluorine, chlorine, bromine or iodine.

Any halogen substituent on Ar is preferably chlorine or bromine, and more preferably chlorine, and any alkyl or alkoxy substituent is preferably methyl or methoxy, respectively.

When Ar is a substituted phenylene or naphthylene group, the substituents are preferably 2 alkyl groups, an alkyl and a sulpho group or an alkoxy and a sulpho group. Substituted phenylene is preferred to substituted naphthylene.

When Z is a 2,5,6-trihalopyrimidinyl-4 group, this is preferably 2,5,6-trichloropyrimidinyl-4 or 2,6-difluoro-5-chloropyrimidinyl-4; in the 2-methylsulphonyl-5-halo-6-methylpyrimidinyl-4 and 2,3-dihaloquinoxaline-6-carbonyl groups signified by Z, the halogen substituents are preferably chlorine.

In the compounds of formula I, $R_1$ is preferably a hydrogen atom. $R_2$ and $R_3$ are preferably both hydrogen atoms. Ar is preferably an unsubstituted 1,3- or 1,4-phenylene or 1,5-naphthylene group, and more preferably an unsubstituted 1,3- or 1,4-phenylene group. Most preferably, $R_1$, $R_2$, $R_3$ and Ar have their preferred significances simultaneously in the compounds of formula I.

Examples of water-soluble salts of the compounds of formula I are those with cations of formula $R_{10}R_{11}R_{12}R_{13}N^\oplus$ in which each of $R_{10}$ to $R_{13}$, independently, is hydrogen or $(C_{1-4})$ alkyl, unsubstituted or substituted by 1 or 2, preferably 1, hydroxyl group(s), with the provisos that when any of $R_{10}$ to $R_{13}$ is hydroxyalkyl, at least one other of $R_{10}$ to $R_{13}$ is hydrogen and that the hydroxyl group is at least two carbon atoms removed from the nitrogen atom, and those with alkali metals.

The preferred water-soluble salts of the compounds of formula I are those with alkali metals, e.g. lithium, sodium and potassium, most preferably sodium, and the unsubstituted or substituted ammonium salts with ammonia itself, trimethylamine, and mono-, di- and triethanolamine. The most preferred salts are the alkali-metal salts, particularly the sodium salt.

The present invention further provides a process of producing the compounds of formula I or the water-soluble salts thereof comprising reacting a compound of formula II,

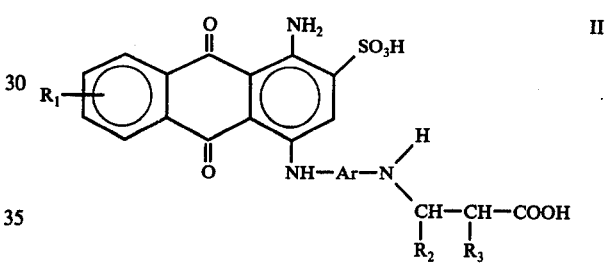

in which $R_1$, $R_2$, $R_3$ and Ar are as defined above, or a water-soluble salt thereof, with a 2,4,5,6-tetrahalopyrimidine, or a 2-methylsulphonyl-4,5-dihalo-6-methylpyrimidine or a 2,3-dihalo-6-carboxyquinoxaline or a functional derivative of the latter compound, and, if required, converting the product into a water-soluble salt.

A suitable functional derivative of the 2,3-dihalo-6-carboxyquinoxaline is the acid chloride.

The process, and isolation of the resulting compound of formula I, may be carried out in conventional manner.

The present invention further provides the new compounds of formula II, as defined above, and the water-soluble salts thereof, and a process for their production, which comprises (a) reacting a compound of formula III,

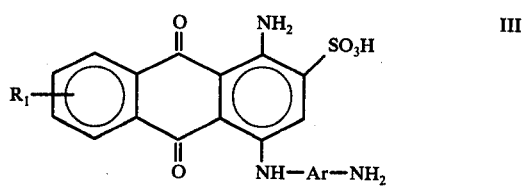

in which $R_1$ and Ar are as defined above, or a water-soluble salt thereof, with a compound of formula IV $$CHR_2 = CHR_3 - COOH \qquad IV$$

in which $R_2$ and $R_3$ are as defined above, or a water-soluble salt thereof, or (b) obtaining a compound of formula II in which $R_2$ and $R_3$ are both hydrogen atoms, comprising reacting a compound of formula III, as defined above, with β-propiolactone, and, if required, converting the product into a water-soluble salt, or (c) reacting a compound of formula V,

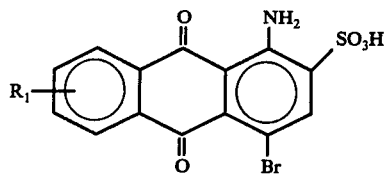

in which $R_1$ is as defined above, or a water-soluble salt thereof, with an amine of formula VI,

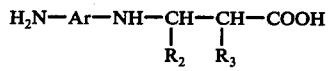

in which $R_2$, $R_3$ and Ar are as defined above, or a water-soluble salt thereof, and, if required, converting the product into a water-soluble salt.

The above process variants (a) to (c) and isolation of the resulting compound of formula II may be carried out in conventional manner for the types of reaction involved. Furthermore, the intermediates of formulae III, IV, V and VI are either known, readily available compounds or may be readily produced by conventional, analogy methods for known compounds.

The compounds of formula I and their water-soluble salts are useful as reactive dyestuffs for the dyeing and printing of leather and those textile materials which contain synthetic or natural polyamides, polyurethane, or natural or regenerated cellulose. Accordingly the present invention provides a method of dyeing or printing such substrates comprising using as a dyeing or printing agent a compound of formula I.

Amongst the textile materials so dyeable are nylon, wool, silk, cotton cord, poplin, brushed cotton, cotton gabardine, cotton sateen, viscose sateen and staple fibre. The substrates can be dyed or printed either as fibres or as textiles, and the latter may consist of a single constituent or mixed constituents. An example of the latter is a mixed cotton-polyester fibre, the polyester therein being dyeable in conventional manner with a disperse dyestuff.

The compounds of formula I and their water-soluble salts may be used as dyeing or printing agents in dyebaths or printing pastes according to conventional methods for reactive dyestuffs. They exhibit notable substantivity, degree of fixation and stability to hydrolysis.

In printing, the outline sharpness is notable, and in the pad dyeing process the solubility and the stability of the compounds in the padding liquors are notable. In both cases the ability of any excess compound to be washed away from the dyeing or print is advantageously good.

The dyeings obtained are of blue shades and have notable processing and useage fastnesses, such as light fastness and wet fastness, e.g. wash, perspiration, chlorine and chlorine bleach fastness.

The following Examples 1 and 2 illustrate the process of producing the compounds of formula I. In these, and in the Examples 3 to 5 following, parts and percentages are by weight and temperatures are in degrees Centigrade.

EXAMPLE 1

To a mixture of 48.1 parts of 1-amino-4-(3'-carboxyethylaminophenyl)amino-anthraquinone-2-sulphonic acid and 400 parts of water are added 25 parts of aqueous sodium hydroxide solution, giving a pH of 6.5 to the resulting solution. During 1 hour, 17 parts of 2,4,6-trifluoro-5-chloropyrimidine are added to the solution at 0°–5°, maintaining the pH within the range 5.5 to 6.5 by dropwise addition of aqueous sodium hydroxide solution.

After 4 hours the reaction solution is salted out by addition of 40 parts of sodium chloride during 30 minutes. The resulting suspension is then stirred for 4 hours and thereafter filtered, the collected solid then being washed with 500 parts of a 10% sodium chloride solution and dried at 40° in vacuo.

The product has the structure indicated against number 1 in Table 1 following. In ground form it is a dark blue powder, which readily dissolves in water.

EXAMPLE 2

To a mixture of 48.1 parts of 1-amino-4-(3'-carboxyethylaminophenyl)amino-anthraquinone-2-sulphonic acid and 400 parts of water are added 25 parts of aqueous sodium hydroxide solution giving a pH of 6.5 to the resulting solution. During 1 hour, 24 parts of 2,4,5,6-tetrachloropyrimidine are added to the solution at 50°–60°, maintaining the pH within the range 6.5 to 7.5 by dropwise addition of aqueous sodium hydroxide solution.

After 3 hours, 30 parts of sodium chloride are added to the reaction solution, which is then stirred for 4 hours. Precipitation of product occurs as the temperature falls, and the product is removed from the suspension at 20° by filtration, washed with 500 parts of 10% aqueous sodium chloride solution, and dried at 60° in vacuo.

The product has the structure indicated against number 18 in Table 1 following.

In Table 1 following, structures of examples of compounds of formula I, including the compounds of the above two Examples, are given, together with their shade of dyeing. The latter is indicated by means of a numerical key, whereby 1 = blue, 2 = greenish blue, 3 = reddish blue, and 4 = green-blue.

TABLE 1
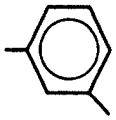
| Compound No. | $R_1$ | $R_2$ | $R_3$ | Ar | Z | Shade of dyeing |
|---|---|---|---|---|---|---|
| 1 | H | H | H | 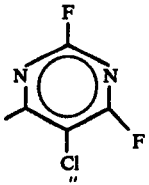 | 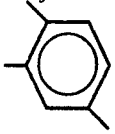 | 1 |
| 2 | H | H | H |  | " | 1 |
| 3 | H | H | H | 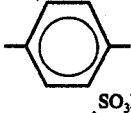 | " | 2 |
| 4 | H | H | H |  | " | 1 |
| 5 | H | H | H | 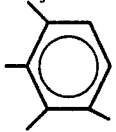 | " | 3 |
| 6 | H | H | H | 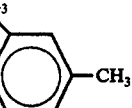 | " | 1 |
| 7 | H | H | H | 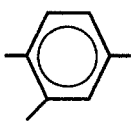 | " | 4 |
| 8 | H | H | H | 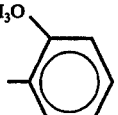 | " | 2 |
| 9 | H | H | H | 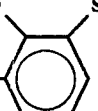 | " | 2 |
| 10 | H | H | $CH_3$ | 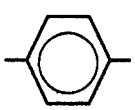 | " | 2 |

TABLE 1-continued
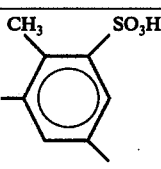
| Compound No. | $R_1$ | $R_2$ | $R_3$ | Ar | Z | Shade of dyeing |
|---|---|---|---|---|---|---|
| 11 | H | H | H | 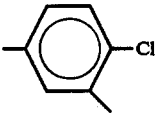 | " | 1 |
| 12 | H | H | H | 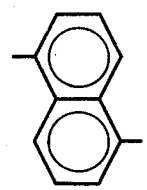 | " | 1 |
| 13 | H | H | H |  | " | 1 |
| 14 | 6-$SO_3H$ | H | H |  | " | 2 |
| 15 | 7-$SO_3H$ | H | H | 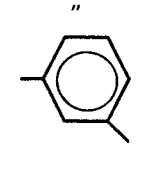 | " | 2 |
| 16 | 5-$SO_3H$ | H | H | " | " | 2 |
| 17 | H | $CH_3$ | H | " | " | 2 |
| 18 | H | H | H |  | 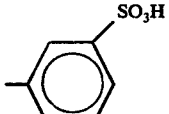 | 1 |
| 19 | H | H | H | 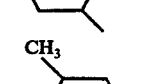 | " | 2 |
| 20 | H | H | H | 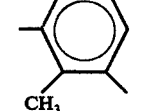 | " | 1 |
| 21 | H | H | H | 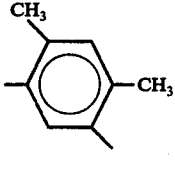 | " | 3 |
| 22 | H | H | H |  | " | 1 |

TABLE 1-continued

| Compound No. | $R_1$ | $R_2$ | $R_3$ | Ar | Z | Shade of dyeing |
|---|---|---|---|---|---|---|
| 23 | H | H | H | 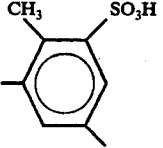 | " | 4 |
| 24 | H | H | H | 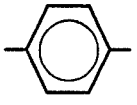 | " | 2 |
| 25 | H | H | H | 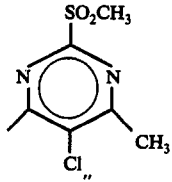 | " | 2 |
| 26 | H | H | H | 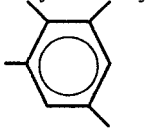 | 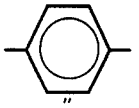 | 2 |
| 27 | H | H | H | 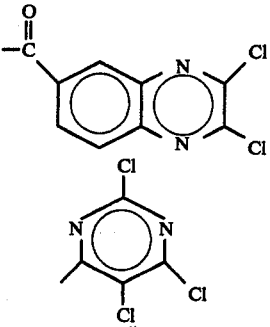 | " | 1 |
| 28 | H | H | H | 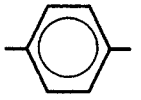 | " | 1 |
| 29 | H | H | H | " | 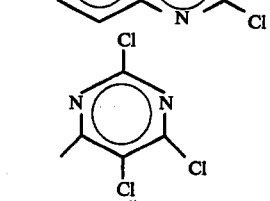 | 1 |
| 30 | 6-$SO_3H$ | H | H | 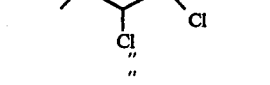 | | 2 |
| 31 | H | $CH_3$ | H | " | " | 2 |
| 32 | H | H | $CH_3$ | " | " | 2 |

The following Examples 3 to 5 illustrate the production of intermediates of formula II.

EXAMPLE 3

To a suspension of 41 parts of 1-amino-4-(3'-aminophenyl)amino-anthraquinone-2-sulphonic acid in 250 parts of water at room temperature are added 15 parts of acrylic acid, stabilized against polymerisation, and sufficient aqueous sodium hydroxide solution to bring the pH of the resulting solution to 10. The pH is then reduced to 4.5 by addition of 10 parts of acetic acid, and the solution is refluxed for 24 hours.

The resulting dark blue solution is cooled and the product precipitated therefrom by dropwise addition of 15 parts of conc. hydrochloric acid. After removal of the precipitate by filtration, this is washed with 100 parts of 1% hydrochloric acid and dried at 80° in vacuo.
Produced are 30 parts of a compound of formula,

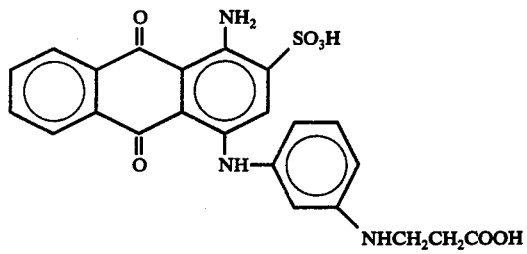

EXAMPLE 4

To a solution of 41.3 parts of 1-amino-4-(3'-amino-4'-methylphenyl)amino-anthraquinone-2,5'-disulphonic acid in 300 parts of water and 10 parts of aqueous sodium hydroxide solution at 30° are added dropwise 10 parts of β-propiolactone. During the addition the pH of the reaction mixture is maintained between 7 and 8 by dropwise addition of a 20% aqueous sodium carbonate solution. After completion of reaction has been determined by chromatographic analysis of the reaction mixture, the latter is acidified with hydrochloric acid to pH 3. The resulting precipitate is collected by filtration, washed with 100 parts of 1% hydrochloric acid and dried at 80° in vacuo.

Produced are 32 parts of a compound of formula,

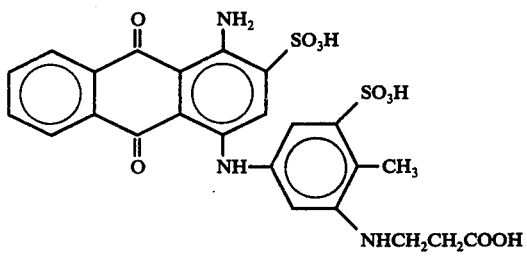

EXAMPLE 5

To a solution of 20.7 parts of N-(4-aminophenyl)-β-alanine in 200 parts of water and 20 parts of aqueous sodium hydroxide solution at 60° are added consecutively with stirring 38.2 parts of 1-amino-4-bromoanthraquinone-2-sulphonic acid, 12 parts of sodium bicarbonate and 50 parts of water. As soon as the mixture has become homogeneous, 1 part of copper chloride is added and the mixture is stirred for 8 hours at 60°.

Thereafter the product is salted out and collected by filtration of the mixture at 20°. Produced are 23 parts of a compound of formula,

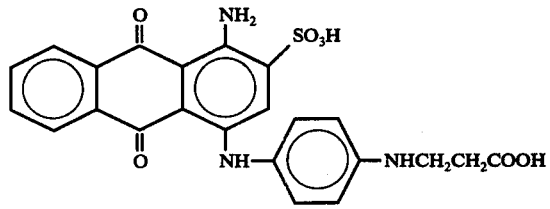

The methods of using the compounds of formula I are illustrated in the following Application Examples A to C.

Application Example A

1 Part of the product produced according to Example 1 above is dissolved in 300 parts of water. In the solution is immersed 10 parts of cotton, and the temperature of the solution is raised to 40° within 10 minutes. 15 Parts of Glauber's salt are then added, followed 30 minutes later by 3 parts of sodium carbonate. The resulting dyebath is left for 1 hour at 40°.

The dyed cotton is removed from the dyebath, cold and hot rinsed, and soaped for 20 minutes in a boiling solution containing 500 parts of water and 0.5 parts of sodium alkylsulphonate. The cotton is finally rinsed, and possesses a blue colour.

Application Example B

A printing paste consisting of 40 parts of the product produced according to Example 1 above, 100 parts of urea, 340 parts of water, 500 parts of an alginate thickener solution and 20 parts of sodium carbonate is applied to cotton textile according to a conventional printing method. The printed textile is then dried, fixed with steam at 105° during 1 minute, hot rinsed, soaped in boiling solution and finally dried.

Application Example C 3 g of the product produced according to Example 2 above and 20 g of urea are dissolved in 50 g of water at 20°. After addition of 15 g of 10% aqueous sodium carbonate solution, the volume of the solution is made up to 100 ml.

The solution is padded on 20 g of cotton fabric to an uptake of 80% of its dry weight, and the padded fabric is then dried and steamed at 103° for 10 minutes. Finally the fabric is rinsed, soaped in boiling solution, further rinsed, and dried, to yield a fabric of a blue colour.

What is claimed is:

1. A compound of formula

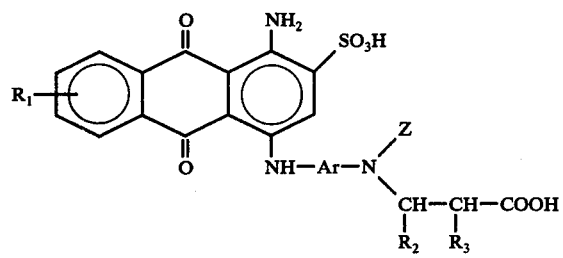

in which
$R_1$ is a hydrogen atom or a sulpho group attached at the 5-, 6-, 7- or 8-position of the anthraquinone nucleus,
each of
$R_2$ and $R_3$ is a hydrogen atom or one is a hydrogen atom and the other is a methyl group,
Z is a 2,5,6-trihalopyrimidinyl-4 or 2-methylsulphonyl-5-halo-6-methylpyrimidinyl-4 group,
and
Ar is a 1,3- or 1,4-phenylene or a 1,5-naphthylene group, unsubstituted or substituted with one or two substituents selected from $(C_{1-4})$ alkyl, $(C_{1-4})$ alkoxy, sulpho and carboxyl groups and halogen atoms,
with the provisos (i) that the group

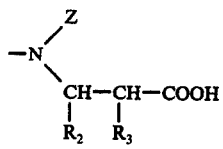

is not attached at an adjacent position on the phenylene or naphthylene nucleus to any sulpho substituent on that nucleus, and (ii) two sulpho or two carboxyl groups, or one sulpho and one carboxyl group cannot simultaneously be present on the phenylene nucleus, or a water soluble salt thereof.

2. A compound according to claim 1, in which each of $R_1$, $R_2$ and $R_3$ is a hydrogen atom, Z is a 2,5,6-trichloro-pyrimidinyl-4, a 2,6-difluoro-5-chloropyrimidinyl-4 or a 2-methylsulphonyl-5-chloro-6-methylpyrimidinyl-4 group, and Ar is an unsubstituted 1,3- or 1,4-phenylene group.

3. A compound according to claim 1, in which the water-soluble salt is one with an alkali metal or with ammonia, trimethylamine or mono-, di- or triethanolamine.

4. A compound according to claim 1 wherein Z is a 2,5,6-trihalopyrimidinyl-4 group.

5. A compound according to claim 1 wherein any halogen substituent on Ar is chlorine or bromine and any alkyl or alkoxy substituent is methyl or methoxy.

6. A compound according to claim 1 wherein Ar, when substituted, is substituted by 2 alkyl groups or by an alkyl group and a sulpho group or by an alkoxy group and a sulpho group.

7. The compound according to claim 1 of the formula

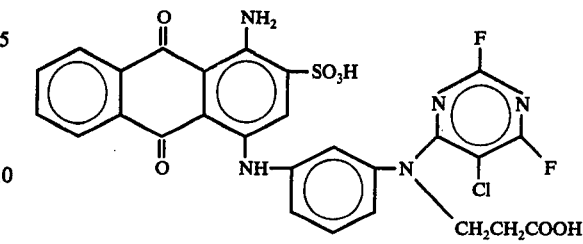

or a water-soluble salt thereof.

8. The compound according to claim 1 of the formula

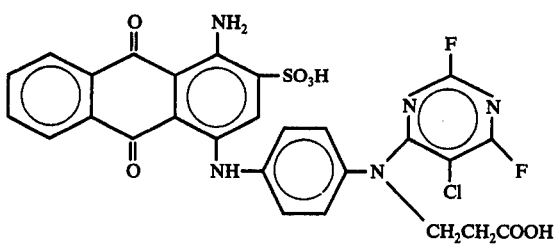

or a water-soluble salt thereof.

9. A compound according to claim 7 wherein the water-soluble salt is an alkali metal salt.

10. A compound according to claim 8 wherein the water-soluble salt is an alkali metal salt.

11. A compound according to claim 4 wherein Z is 2,5,6-trichloropyrimidinyl-4 or 2,6-difluoro-5-chloropyrimidinyl-4.

* * * * *